M. P. JANISCH.
CLOTHES WRINGER.
APPLICATION FILED MAY 14, 1904.
1,018,422.
Patented Feb. 27, 1912.
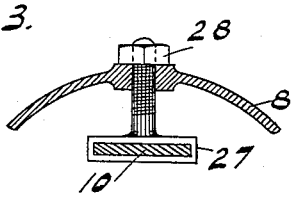
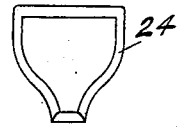
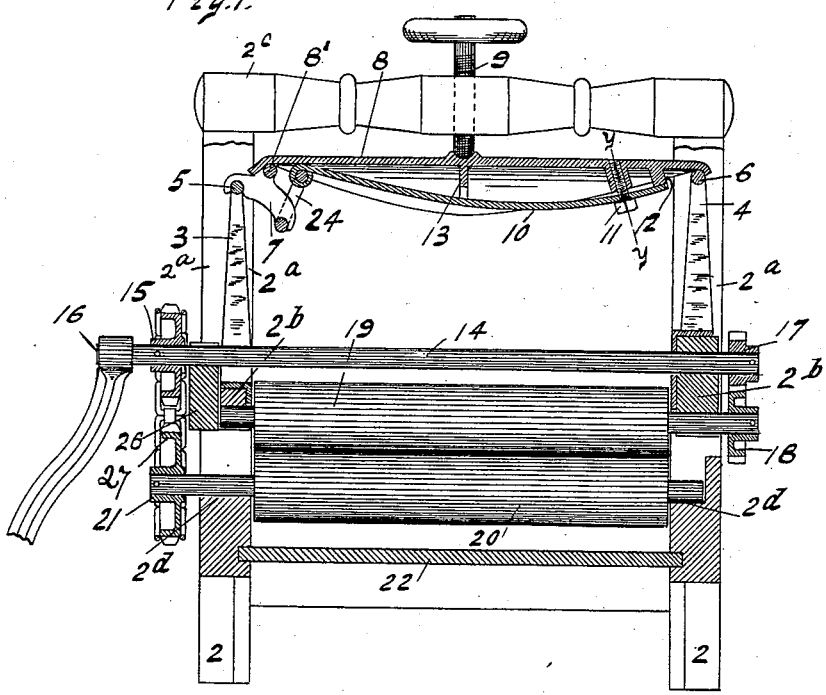
Witnesses
Inventor
Maximilian P. Janisch
Attorney

UNITED STATES PATENT OFFICE.

MAXIMILLIAN P. JANISCH, OF MUSKEGON, MICHIGAN, ASSIGNOR TO LOVELL MANUFACTURING COMPANY, OF ERIE, PENNSYLVANIA, A CORPORATION OF PENNSYLVANIA.

CLOTHES-WRINGER.

1,018,422.  Specification of Letters Patent.  Patented Feb. 27, 1912.

Application filed May 14, 1904. Serial No. 208,027.

*To all whom it may concern:*

Be it known that I, MAXIMILLIAN P. JANISCH, a citizen of the United States, residing at Muskegon, in the county of Muskegon and State of Michigan, have invented new and useful Improvements in Clothes-Wringers, of which the following is a specification.

This invention relates to clothes wringers and consists in certain improvements in the construction thereof as will be hereinafter fully described and pointed out in the claims.

The invention is illustrated in the accompanying drawings as follows:

Figure 1 shows a front elevation of my improved wringer partly in section of my improved construction. Fig. 2 an elevation of the link connecting the spring and bell crank lever. Fig. 3 an alternative construction of fulcrum for the spring.

2 marks the frame sides having the customary slot 2ª, in which is arranged the movable bearings 2ᵇ. These frame sides are connected by top bar 2ᶜ and the cross piece 22. The movable roll 19 is journaled in the movable bearings 2ᵇ. The bottom roll 20 is journaled in bearings 2ᵈ formed in the frame sides. The sliding bearing frames 3 and 4 are secured to the bearings 2ᵇ and move with them. The drive shaft 14 is journaled in a fixed bearing 26 and in the sliding frame 4. One end 16 is arranged to receive a crank and has fixed upon it the sprocket wheel 15. The shaft of the bottom roll 20 also has a sprocket wheel 21 and a chain 27 connects the sprocket wheels 15 and 21 so that the lower roll 20 may be driven by the shaft 14. A gear 17 is fixed on the shaft 14 at the end opposite the end 16 and this gear meshes with the gear 18 on the shaft of the roll 19.

The construction here described is one in ordinary use and is practically the same as that shown in the patent to G. A. Paddock, granted July 11, 1899, #628,545.

The cross bar 8 extends across the wringer preferably into the slots 2ª and is acted upon by a pressure device 9 which as shown is in the form of a screw. One end of this cross bar rests directly upon the upper end 6 of the bearing frame 4, the opposite end of the cross bar is provided with a pivot bearing 8' in which is pivoted a bell crank lever 7. One end of this bell crank lever has a pivotal connection 5 with the upper end of the bearing frame 3. The opposite end of this bell crank lever is connected by a link 24 with a plate spring 10. The opposite end of this spring engages a projection 12 on the cross bar 8 and an adjustable fulcrum 11 in the form of a bolt is passed through the spring and screwed into the cross bar. The cross bar may be reinforced if it is desired by cross rib 13.

This invention is an improvement on the construction shown in the patent to Paddock heretofore mentioned. In the Paddock construction a coil spring is used which is tensioned in a direction parallel to the cross bar 8, and acts on the end of the bell crank lever drawing it in a direction parallel to the cross bar.

One of the primary objects of the construction herein shown is to permit a wide separation of the wringer rolls without unduly increasing the pressure upon them. In the construction herein shown this result is accomplished first by making the spring 10 of considerable length. This is made possible by forming the fulcrum near one end of the cross bar and having the spring extended nearly the full length of the bar so that the movement in opening the rolls does not so flex the spring as to greatly increase the tension. This result is also brought about by the form of bell crank lever.

In assembling wringers of this general type it is desirable to give the spring its proper tension before assembling it in the wringer. In the construction shown this may be readily accomplished inasmuch as the rigidity of the cross bar permits of the tensioning of the spring against it by means of the screw 11. When the wringer is in use this initial tension given to the spring remains undisturbed. The rolls are relieved of pressure through the action of the pressure device 9 and are thrown into spring pressed engagement by this same pressure device 9. Inasmuch as the pressure on the rolls is not greatly increased by the swinging of the bell crank lever the pressure on the rolls is not materially changed even though the pressure device 9 is screwed down farther than necessary. Through this arrangement the rolls are not subjected to undue strain and consequently will wear longer than where they are subjected to the bearing pressures incident to many constructions.

In Fig. 3 I show an alternative construction of fulcrum, in this the strap 27 extends around the spring and the bolt 28 projects from this strap through the cross bar. Section of the cross bar shown in Fig. 3 is on the line $y$—$y$ in Fig. 1.

What I claim is new is—

In a wringer the combination of the frame comprising the top bar and the frame sides; the sliding bearing frames mounted in the frame sides; a rigid cross bar, and a pressure device acting on the cross bar; a plate spring mounted on the cross bar and tensioned to exert pressure in a lateral direction relatively to the cross bar, said spring being secured to the bar intermediate its ends and held under initial tension with the ends of the spring in engagement with the cross bar; and a lever pivoted on the cross bar having one end connected with a sliding bearing frame and the other end with the spring.

In testimony whereof I have hereunto set my hand in presence of two subscribing witnesses.

MAXIMILLIAN P. JANISCH.

Witnesses:
EDWARD TAGGART,
MARY S. TOOKER.

Copies of this patent may be obtained for five cents each, by addressing the "Commissioner of Patents, Washington, D. C."